United States Patent
Jyouzaki et al.

(10) Patent No.: US 10,124,662 B2
(45) Date of Patent: Nov. 13, 2018

(54) RADIATOR FOR SADDLED VEHICLE

(71) Applicant: Kawasaki Jukogyo Kabushiki Kaisha, Kobe-shi, Hyogo (JP)

(72) Inventors: Takahiro Jyouzaki, Akashi (JP); Naoki Arino, Kakogawa (JP); Takayuki Haraguchi, Kobe (JP); Masataka Muroi, Kakogawa (JP); Masafumi Itoh, Kobe (JP)

(73) Assignee: KAWASAKI JUKOGYO KABUSHIKI KAISHA (JP)

( * ) Notice: Subject to any disclaimer, the term of this patent is extended or adjusted under 35 U.S.C. 154(b) by 85 days.

(21) Appl. No.: 15/286,343

(22) Filed: Oct. 5, 2016

(65) Prior Publication Data

US 2017/0021719 A1 Jan. 26, 2017

Related U.S. Application Data

(63) Continuation of application No. PCT/JP2015/053054, filed on Feb. 4, 2015.

(30) Foreign Application Priority Data

Apr. 15, 2014 (JP) .................. 2014-083378

(51) Int. Cl.
- *B60K 11/04* (2006.01)
- *B62J 23/00* (2006.01)
- *B62J 99/00* (2009.01)

(52) U.S. Cl.
CPC ............... *B60K 11/04* (2013.01); *B62J 23/00* (2013.01); *B62J 99/00* (2013.01)

(58) Field of Classification Search
CPC ............ B60K 11/04; B62J 23/00; B62J 99/00
See application file for complete search history.

(56) References Cited

U.S. PATENT DOCUMENTS

| | | | |
|---|---|---|---|
| 7,603,968 | B2 | 10/2009 | Pantow |
| 7,987,936 | B2 | 8/2011 | Yamakura et al. |
| 7,987,938 | B2 | 8/2011 | Morita et al. |
| 9,004,211 | B2 | 4/2015 | Nakamura |
| 2007/0209613 | A1 | 9/2007 | Pantow |

(Continued)

FOREIGN PATENT DOCUMENTS

| | | |
|---|---|---|
| CN | 101164825 | 4/2008 |
| JP | 59-114178 | 7/1984 |

(Continued)

OTHER PUBLICATIONS

English Language Translation of the International Preliminary Report on Patentability (dated Oct. 27, 2016) for PCT/JP2015/053054 (7 pages).

(Continued)

*Primary Examiner* — Brian L Swenson

(57) ABSTRACT

A radiator for the motorcycle includes a core through which a cooling medium flows, a cooling fan which is disposed on a downstream side of the core and ventilates the core, a downwardly opened fan covering for enclosing areas above, on opposite lateral sides and on a downstream side of the cooling fan, and a partition wall for partitioning between an lower portion of the core and a lower portion of the cooling fan so as to suppress the backward flow of the discharge air from the opening towards the core.

9 Claims, 4 Drawing Sheets

(56) References Cited

U.S. PATENT DOCUMENTS

| | | | |
|---|---|---|---|
| 2008/0006329 A1 | 10/2008 | Yamakura et al. | |
| 2008/0236783 A1 | 10/2008 | Morita et al. | |
| 2013/0168039 A1 | 7/2013 | Arai et al. | |
| 2013/0233258 A1 | 9/2013 | Dees et al. | |
| 2013/0248272 A1 | 9/2013 | Nakamura | |
| 2014/0034267 A1* | 2/2014 | Hojo | B60H 1/00457 165/51 |
| 2015/0328979 A1* | 11/2015 | Matsuo | B62J 17/00 180/229 |
| 2016/0090152 A1* | 3/2016 | Sasaki | B62M 7/04 180/229 |
| 2016/0229283 A1* | 8/2016 | Laroche | B62D 25/085 |
| 2016/0244116 A1* | 8/2016 | Komatsu | B62J 23/00 |

FOREIGN PATENT DOCUMENTS

| | | |
|---|---|---|
| JP | 01-262278 | 10/1989 |
| JP | 2002-019662 | 1/2002 |
| JP | 2007-532814 | 11/2007 |
| JP | 2008-013149 | 1/2008 |
| JP | 2008-050006 | 3/2008 |
| JP | 2008-254463 | 10/2008 |
| JP | 2011-173484 | 9/2011 |
| JP | 2013-136273 | 7/2013 |
| JP | 2013-193641 | 9/2013 |

OTHER PUBLICATIONS

International Search Report for PCT/JP2015/053054, filed Feb. 4, 2015 (4 pages).

Decision of Grant dated Oct. 31, 2017 for Corresponding Japanese Patent Application No. 2014-083378 with English Language Translation Summary (4 pages).

Extended and Supplementary Search Report dated Dec. 5, 2017 for Corresponding European Patent Application No. 15780445.1 (9 pages).

* cited by examiner

RADIATOR FOR SADDLED VEHICLE

CROSS REFERENCE TO THE RELATED APPLICATION

This application is a continuation application, under 35 U.S.C § 111(a) of international patent application No. PCT/JP2015/053054, filed Feb. 4, 2015, which claims priority to Japanese patent application No. 2014-083378, filed Apr. 15, 2014, the entire disclosure of which is herein incorporated by reference as a part of this application.

BACKGROUND OF THE INVENTION

Field of the Invention

The present invention relates to a radiator for radiating heat, which radiator is mounted on a saddled vehicle or a saddle-riding vehicle such as, for example, a motorcycle.

Description of Related Art

A radiator of a kind mounted on the saddle-riding vehicle such as, for example, a motorcycle has been well known from, for example, the patent document 1 listed below, in which includes an electrically powered fan is disposed in a core of the radiator for heat radiation adjacently from a downstream side of the incoming wind, and a shroud encloses the electrically powered fan. The shroud disclosed in the patent document 1 opens downwards while enclosing it from the downstream side of the incoming wind and also encloses opposite lateral sides from above.

According to the radiator disclosed in the patent document 1 referred to above, since discharge air (hot air) is flown out from a downward opening of the shroud towards an area below the electrically powered fan, the feeling of discomfort incurred by exposure of a rider to the discharge air can decrease.

PRIOR ART LITERATURE

Patent Document 1: JP Laid-open Patent Publication No. 2013-136273

It has, however, been found that with the radiator disclosed in the above discussed patent publication 1, although the discharge air having passed through the electrically powered fan for the radiator is discharged in a direction downwardly of the electrically powered fan, it may occur that a portion of the discharge air may flow backwards through an area downwardly of the core and then towards an area forwardly of the vehicle body before it is again drawn from the radiator. Once the discharge air then heated to a high temperature is again drawn into the radiator, the heat radiating efficiency of the radiator will be lowered.

SUMMARY OF THE INVENTION

In view of the foregoing, it is an object of the present invention to provide a radiator for a saddle-riding vehicle designed to avoid backflow of the discharge air forwardly of the radiator core to thereby prevent the lowering of the radiating efficiency.

In order to accomplish the foregoing object, the radiator for the saddle-riding vehicle designed in accordance with the present invention is a radiator for radiating heat from a cooling medium used in a drive source mounted on the saddle-riding vehicle, and includes a core through which the cooling medium flows, a cooling fan disposed on a downstream side of the core with respect to a flow direction of an incoming wind and configured to ventilate the core, a downwardly opened fan covering regions above the cooling fan, opposite sides of the cooling fan and a downstream side of the cooling fan with respect to the flow direction, and a partition wall partitioning between a lower portion of the core and a lower portion of the cooling fan, which partition wall suppresses the backflow of the discharge wind from the opening towards the core.

According to the above described construction, when a discharge air having passed through the cooling fan of the radiator is to be discharged from a downwardly oriented opening in the fan covering, even though a portion of the discharge air is likely to flow backwards towards a front of the radiator, the backward flow is blocked by the partition wall. Therefore, there is no possibility of being drawn again into the radiator. Since the discharge air can therefore be smoothly discharged from the downwardly oriented opening in the fan covering towards downwardly of the opening, the rider may be freed from feeling discomfort as a result of its exposure to the discharge air, and also, an undesirable lowering of the heat radiating efficiency of the radiator can also be suppressed.

In a preferred embodiment of the present invention, the partition wall is preferably protrudes downwardly beyond the core. According to this construction, since entanglement of the discharge air towards downward of the radiator can be assuredly inhibited, the backward flow of a portion of the discharge air can be further efficiently avoided.

In a preferred embodiment of the present invention, the cooling fan has an outer diameter D that is preferably substantially identical to the vertical length H of the core, in which case the length P of protrusion of the fan covering from the core to an area downwardly is preferably within the range of 0.1 to 0.3 times the vertical length H of the core. According to this construction, the fan outer diameter D is so chosen as to be substantially equal to the vertical length of the core and, therefore, even under the condition in which the incoming wind cannot be utilized sufficiently during, for example, a low speed drive or parking, the heat radiating efficiency can be increased by guiding the wind towards a major portion of the core. Also, the protrusion length P is so chosen as to be within the range of 0.1 to 0.3 H and, hence, the dimension of the fan covering does not unnecessarily increase. Accordingly, an undesirable increase of the size of the radiator in its entirety including the fan covering can be suppressed, and also the discharge air from the cooling fan of the radiator can be smoothly discharged through the opening below the fan covering while an undesirable lowering of the velocity of flow of the discharge air from the cooling fan, which would result from the frictional loss with a fan covering inner surface, is avoided.

In a preferred embodiment of the present invention, the partition wall includes a fan adjacent region confronting an outer periphery of the cooling fan formed with a guide portion which is inclined towards a downstream side in a direction radially inwardly of the cooling fan so that the discharge air is guided towards an outer periphery of a fan housing of the cooling fan. An angle of inclination θ of the guide portion relative to a front surface of the cooling fan is so set as to be within the range of, for example, 30 to 60°. According to this construction described above, the discharge air can be guided towards the outer periphery of the fan housing of the cooling fan along the guide portion, and thus, the discharge air so guided towards the outer periphery of the fan housing can be quickly discharged from the downwardly oriented opening of the fan covering without allowing the discharge air to pass again through the cooling fan.

In a preferred embodiment of the present invention, the guide portion is preferably provided to confront an outer periphery of a lower half portion of the cooling fan. According to this construction, while the size of the fan covering is made as small as possible, an undesirable backward flow of the discharge air, discharged downwardly from the cooling fan, towards front of the core can be suppressed.

In a preferred embodiment of the present invention, the fan covering is fitted to the core through a mounting piece. In which case the fan covering, the partition wall and the mounting piece preferably form a one piece construction. According to this construction, the handlability increases as a result of the number of component parts being reduced and, hence, the fitting of the fan covering to the core can be conveniently performed.

In a preferred embodiment of the present invention, a rear wall for enclosing the cooling fan from the downstream side with respect to the flow direction preferably lies perpendicular to a shaft axis of the cooling fan. According to this construction, as compared with the case in which in order to smoothen the discharge air towards below the rear wall is inclined rearwardly towards the downward to form a so-called flared fan outlet space, the dimension of an upper portion of the fan outlet space in the shaft axial direction, that is, the depth of the upper portion of the fan covering increases. Therefore, the heat radiating efficiency increases as a result that the upper portion of the core is sufficiently ventilated.

In a preferred embodiment of the present invention, the fan covering is, as viewed in a direction along a shaft axis of the cooling fan, preferably of a generally inverted U-shape with an upper portion thereof reduced in widthwise dimension and also with a lower portion increased in widthwise dimension. According to this construction, the fan outlet space with its widthwise boundary flaring from an upper area towards a lower area is formed and, therefore, flow of the discharge air towards the lower area is smoothened.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Figure 1:
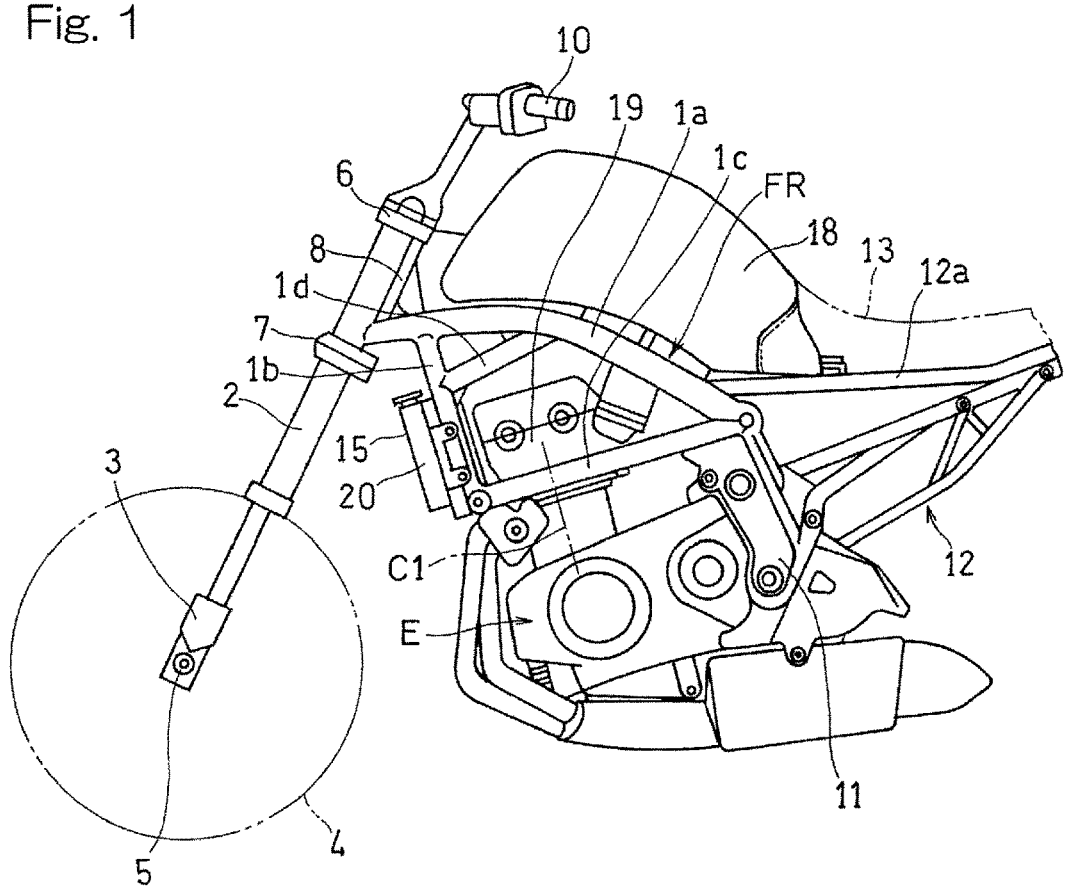
FIG. 1 is a side view showing a front half section of a motorcycle equipped with a radiator designed in accordance with a preferred embodiment of the present invention.

A preferred embodiment of the present invention will be described in detail with reference to the accompanying drawings. In particular, FIG. 1 illustrates a front half section of a motorcycle to which a radiator designed in accordance with the preferred embodiment of the present invention is applied. Referring to FIG. 1, the motorcycle of the present invention includes a main frame 1 forming the front half section of a vehicle frame structure FR and a rear frame 12 forming a rear half section thereof. A front fork 2 is supported by a front end of the main frame 1, and a front wheel 4 is supported in a bottom casing 3, provided in a lower end portion of the front fork 2, through an axle 5.

The front fork 2 is rotatably supported by a head pipe 8 at the front end of the main frame 1 together with an upper bracket 6 and a lower bracket 7 both cooperating to support the front fork 2, and a handlebar 10 is fitted to the upper bracket 6. On the other hand, a swingarm bracket 11 is secured to a rear end lower portion of the main frame 1, and a swingarm for supporting a rear wheel (not shown) is pivotally by the swingarm bracket 11. A combustion engine E, which is a drive source for driving the rear wheel, is supported by an intermediate lower portion of the main frame 1.

The main frame 1 includes a pair of left and right first frame pieces 1a and 1a which are so bent as to extend downwards after having been extended in a forward and rearward direction or longitudinal direction of the motorcycle, a pair of left and right second frame pieces 1b and 1b each having am upper end portion jointed at a front portion of the associated first frame piece 1a in the rearward vicinity of the head pipe 8, a third frame piece 1c jointed between a lower end portion of the second frame piece 1b and an intermediate bend portion of the first frame piece 1a, and a pair of left and right fourth frame piece 1d each having its opposite ends jointed respectively to a vertical direction intermediate portion of the associated second frame piece 1b and a front portion of the first frame piece 1a forwardly of the intermediate bent portion.

The rear frame 12 referred to above includes a pair of left and right seat rails 12a connected respectively to the first frame pieces 1a and 1a. A rider's seat 13 and a fellow passenger's rear seat (not shown) are supported by those seat rails 12a. A radiator 15 for radiating heat from a cooling medium used in the combustion engine E is fitted to an area of the front portion of the main frame 1 diagonally upwardly and rearwardly of the front wheel 4. The cooling medium referred to above is employed in the form of, for example, a cooling water.

The radiator 15 assumes a forwardly tilted position in which, as is the case with the combustion engine E, an upper end portion thereof is positioned forwardly of a lower end portion thereof, and is tilted at an angle within the range of 10 to 20° (about 15° in FIG. 1) relative to a vertical direction when in an empty condition. The tilted radiator 15, when viewed from a lateral side, lies parallel to the second frame piece 1b and a cylinder axis C1 of the combustion engine E. A fuel tank 18 is supported at an upper portion of the main frame 1, that is, a vehicle body upper portion so as to occupy a position between the head pipe 8 and the rider's seat 13.

In the next place, the details of the radiator 15 will be described with particular reference to FIGS. 2 to 8. Those figures illustrate an assembled condition in which a cooling fan 28 and a fan covering 30 are assembled in the radiator 15. Particularly FIGS. 2 and 3 illustrate a front elevational view and a longitudinal sectional view, respectively, of the radiator 15.

Figure 2:
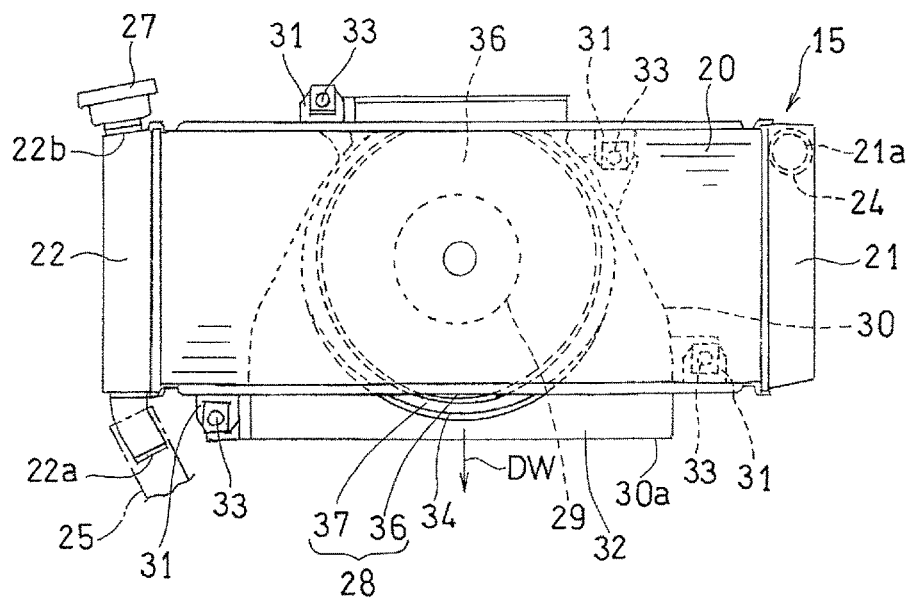
FIG. 2 is a front elevational view of the radiator as viewed from a forward side.
Figure 3:
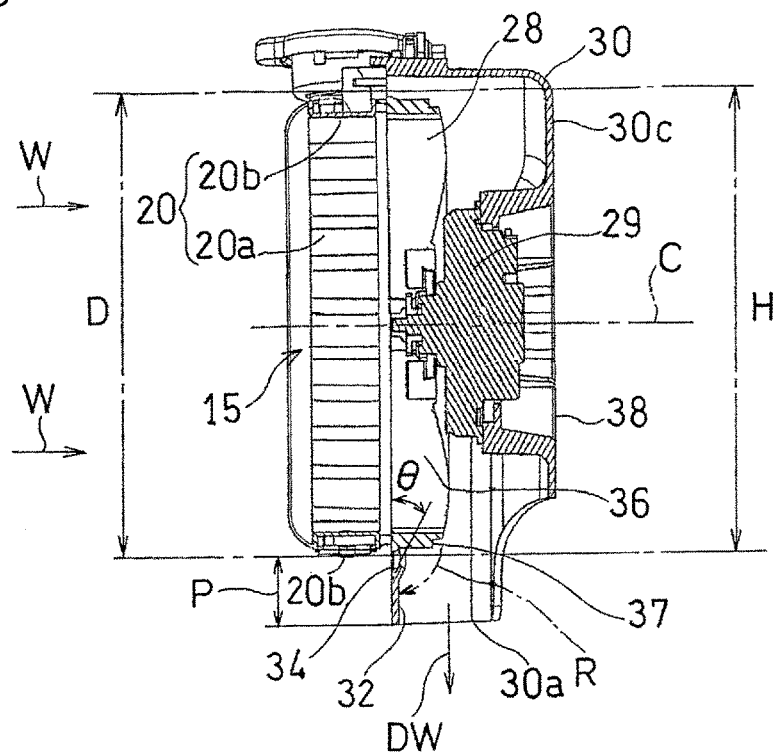
FIG. 3 is a longitudinal sectional view of the radiator.

As shown in FIG. 2, the radiator 15 represents a rectangular shape of a horizontal format (elongated in a vehicle widthwise direction) when viewed from a front side, and includes a core 20 for draining the cooling medium through a plurality of fins in a horizontal direction. An introducing tank 21 for the cooling medium is provided at a right end (left side of a vehicle body) of the core 20 and a deriving tank 22 for the cooling medium is provided at a left end (right side of the vehicle body) of the core 20. In other words, the radiator 15 employed in the practice of the preferred embodiment of the present invention is a cross flow type. It is, however, to be noted that the radiator that can be employed in the practice of the present invention is not necessarily limited to that type and may be of a vertical type in which the cooling medium is drained by the core 20 in an up and down direction or vertical direction. It is also to be noted that the terms "left side" and "rear side", or similar notations, that are hereinabove and hereinafter used are to be understood as meaning relative terms descriptive of positions and/or directions as viewed from a vehicle rider occupying the seat.

The introducing tank 21 is operable to introduce the cooling medium of a high temperature, that is discharged from the cylinder head 19 of the combustion engine E shown in FIG. 1, and then guide it towards the core 20 shown in FIG. 2. The introducing tank 21 has an upper end portion provided with a cylindrical cooling medium inlet 21a, and an introducing hose 24 for introducing the high temperature cooling medium from the cylinder head 19 (shown in FIG. 1) is fluid connected with this cooling medium inlet 21.

The deriving tank 22 of the radiator 15 is operable to guide the cooling medium, which is lowered in temperature as a result of passage through the core 20, towards an engine E side. The deriving tank 22 has a lower end portion provided with a cylindrical cooling medium outlet 22a, and a deriving hose 25 is fluid connected with this cooling medium outlet 22a. The deriving tank 22 also has an upper end portion provided with a replenishing port 22b through which the cooling medium is replenished, and this replenishing port 22b is closed by a cap 27 during a normal time.

As shown in FIG. 3, on a back side (rear side) of the core 20 of the radiator 15, the cooling fan 28 for ventilating the core 20 and an electric drive motor 29 for driving the cooling fan 28 are disposed. The cooling fan 28 in the present embodiment includes a rotary blade assembly 36, drivingly connected with the electric drive motor 29, and a fan housing 37 for enclosing an outer periphery of the rotary blade assembly 36, but the fan housing 37 may be dispensed with. Areas above, on opposite lateral sides and on a downstream side (rear side) of both of the cooling fan 28 and the electric drive motor 29 are enclosed by the fan covering 30. The fan covering 30 has a downwardly oriented opening 30a defined therein.

A partition wall 32 partitioning between a lower portion of the core 20 and a lower portion of the cooling fan 28 is provided radially outwardly of a front portion of the cooling fan 28. The partition wall 32 is operable to suppress a backflow of a discharge air DW through the opening 30a from flowing into the core 20. The axial position of a front surface of the partition wall 32 is in flush with a front surface of the rotary vane assembly 36 of the cooling fan 28. The core 20 is supported by a frame assembly 20b, which is rectangular in shape when viewed from front and which encloses the periphery of a plurality of fins. The partition wall 32 protrudes downwardly from an undersurface of the frame assembly 20b.

Figure 4:
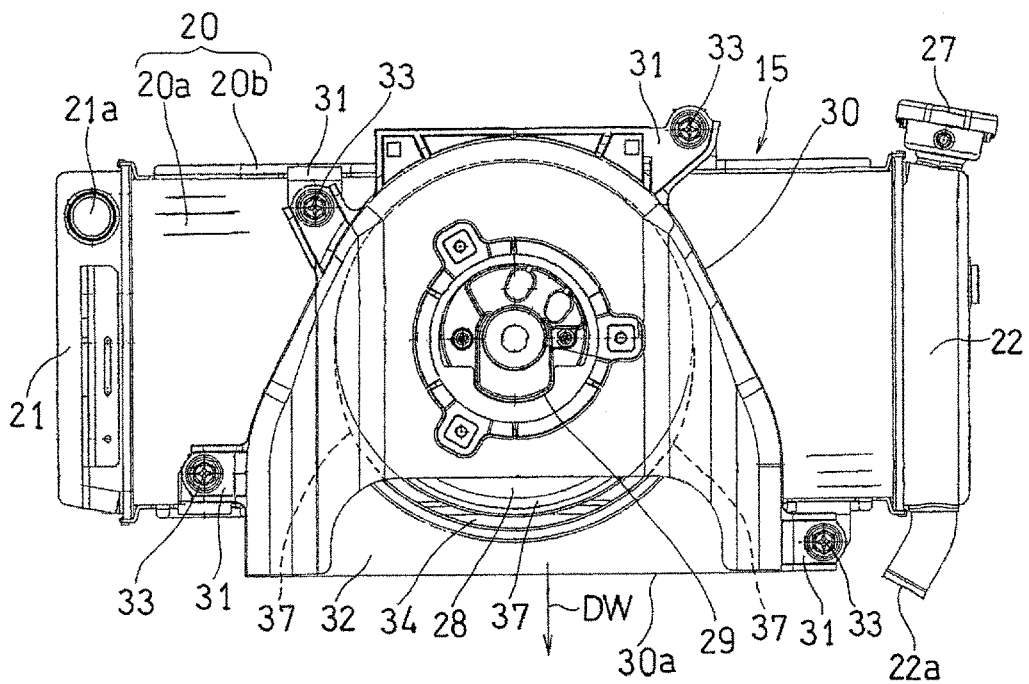
FIG. 4 is a rear view of the radiator as viewed from a rear side.

As shown in a rear view of FIG. 4, the fan covering 30 has a plurality of mounting pieces 31 provided in the outer periphery thereof and is fitted to the frame assembly 20b of the core 20 with the plurality of the mounting pieces 31 secured thereto by means of screws. The fan covering 30 and both of the partition wall 32 and the mounting pieces 31 are of one piece construction formed of, for example, a resinous material with the use of any known molding technique. The fan covering 30, when viewed in a direction along a shaft axis C of the cooling fan 28, is of a generally inverted U-shape having a reduced width in an upper portion thereof and a large width in a lower portion thereof.

Figure 5:
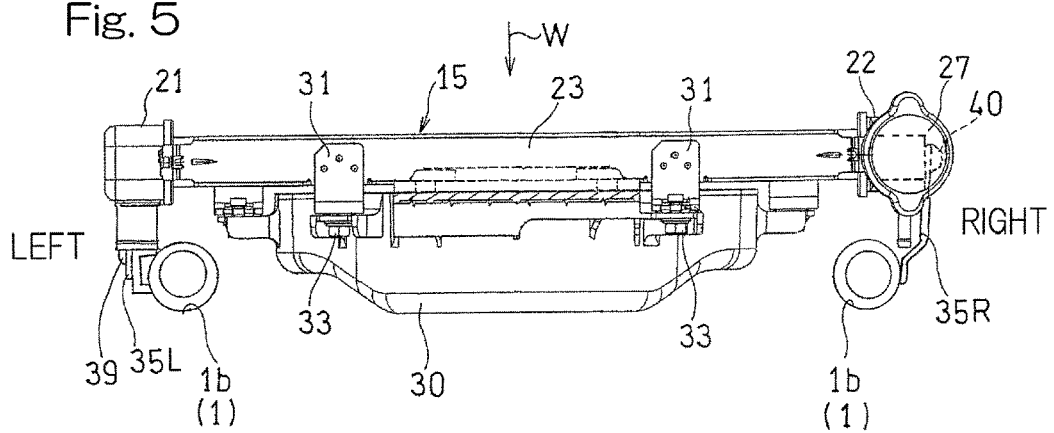
FIG. 5 is a top plan view of the radiator.

As shown in FIG. 5 showing a top plan view, the introducing tank 21 on a left side of the radiator 15 is fitted to the second frame piece 1b on a left side of the main frame 1 through a plate-shaped left side mounting piece 35L. On the other hand, the deriving tank 22 on a right side of the radiator 15 is fitted to the second frame piece 1b on a right side through a plate-shaped right side mounting piece 35R.

Figure 6:
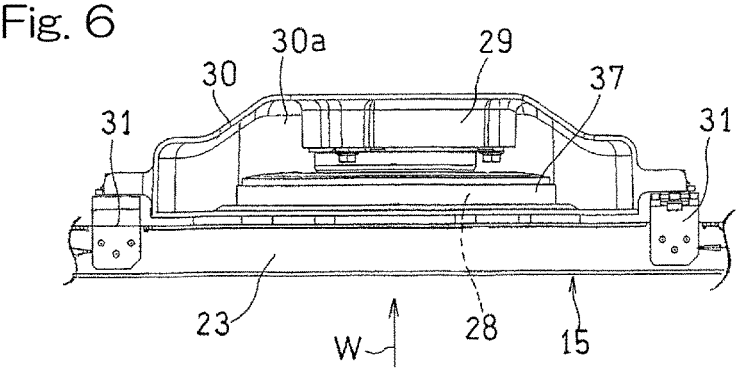
FIG. 6 is a bottom plan view of the radiator.

As shown in a bottom plan view of FIG. 6, the cooling fan 28 is covered by the fan housing 37. The electric drive motor 29 is disposed rearwardly of this cooling fan 28 and both of the cooling fan 28 and the electric drive motor 29 are covered by the fan covering 30.

Figure 7:
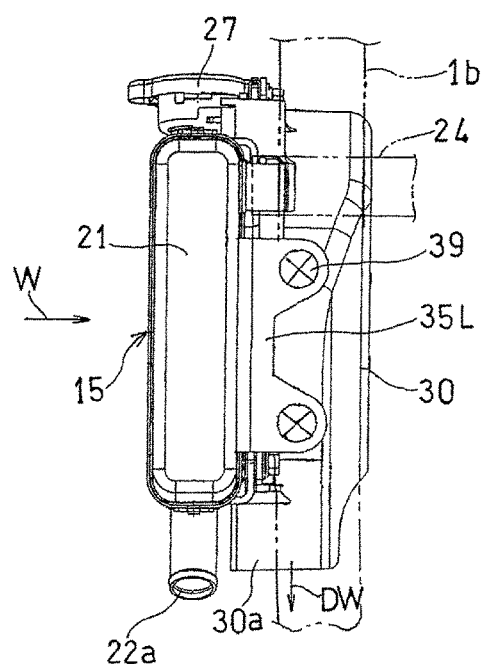
FIG. 7 is a side view of the radiator as viewed from a left side of a vehicle body.
Figure 8:
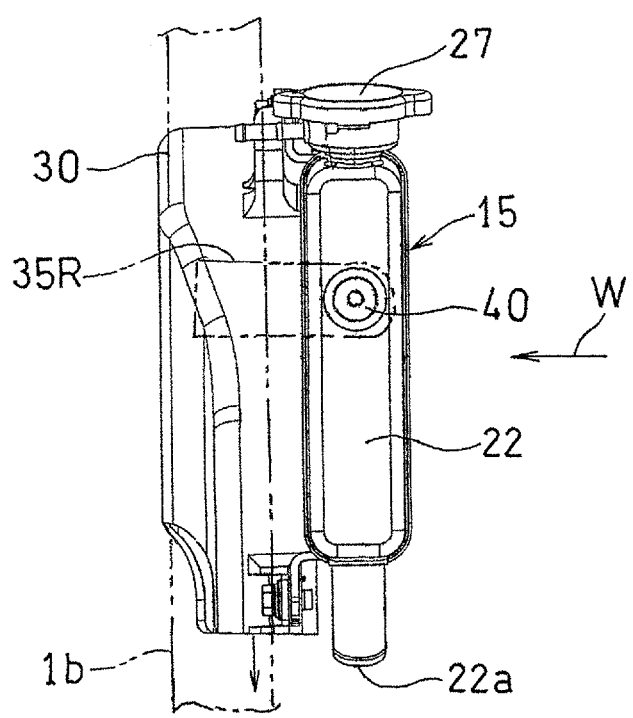
FIG. 8 is a side view of the radiator as viewed from a right side of the vehicle body.

As shown in FIG. 7 showing a side view as viewed from a vehicle left side, the left side mounting piece 35L is welded to the introducing tank 21 of the radiator 15, and this left side mounting piece 35L is removably fitted to the second frame piece 1b on the left side by means of two, upper and lower screw members 39 and 39. Also, as shown in FIG. 8 showing a side view as viewed from a vehicle right side, the right side mounting piece 36R is welded to the second frame piece 1b on the right side, and this right side mounting piece 35R is removably fitted to the deriving tank 22 on the right side of the radiator 15 by means of a single screw member 40.

As shown in FIG. 3, the partition wall 32 includes a region confronting the outer periphery of the cooling fan 28, that is, a fan adjacent region proximate to the outer periphery of the fan housing 37, formed with a guide portion 34. This guide portion 34 is so inclined on a downstream side (rear side) towards a radial inner side of the cooling fan 28 so that air can be guided towards the outer periphery of the fan housing 37 of the cooling fan 28. This guide portion 34 is provided to confront the outer periphery of a lower half of the cooling fan 28 as shown in FIG. 4. As shown in FIG. 3, the angle of inclination $\theta$ of the guide portion 34 relative to a surface perpendicular to a shaft axis C, that is, a cooling fan front surface is so chosen as to be within the range of 30 to 60° and, preferably, within the range of 40 to 50°.

The outer diameter D of the cooling fan 28 including the fan housing 37 is so chosen as to be substantially equal to a vertical length H of the core 20, that is, D=0.9 to 1.1 H, but the diameter D may be of a small value, for example, approximately 0.7 H to 0.9 H. The length P of protrusion of the partition wall 32 in a direction downwardly from the core 20 is so chosen as to be 0.1 to 0.3 times the vertical length H of the core 20 and, preferably, 0.15 to 0.25 times the vertical length H. If the protrusion length P is not greater than 0.1 times the vertical length H, no sufficient effect of preventing the discharge air DW from flowing backwardly can be obtained. The backward flow preventive effect will be sufficient if the protrusion length P is 0.3 times the vertical length H. But if it exceeds the value of 0.3 times the vertical length H, the radiator 15 in its entirety including the fan covering will become large in size. Also, a rear wall 30c on a downstream side (rear side) of the fan covering 30, which covers the cooling fan 28 from the downstream side (rear side), lies perpendicular to the shaft axis C of the cooling fan 28.

In the construction hereinabove described, the radiator 15 is so configured that areas above and on opposite sides and on a downstream side (rear side) of the cooling fan 28 for ventilating the core 20 are covered by the downwardly opened fan covering 30. Therefore, the discharge air DW flowing through the core 20 of the radiator 15 and the cooling fan 28 is assuredly discharged in a direction downwardly from the downwardly oriented opening 30a of the fan covering 30. Accordingly, the rider will not be exposed to the discharge air DW.

Also, when the discharge air DW having passed through the cooling fan 28 is discharged from the opening 30a of the fan covering 30, if a portion of the discharge air DW will be likely to flow backwards, as shown by the arrow shown by the double dotted line, in a direction forwardly of the vehicle body, the backward flow of the discharge air DW can be blocked by the partition wall 32. Therefore, the discharge air DW can be prevented from being again sucked from front into the core 20. Accordingly, the heat radiating efficiency of the radiator 15 will not be lowered as a result of entanglement of the discharge air DW of high temperature, thus allowing the radiator 15 to exhibit its original performance.

Also, since the partition wall 32 protrudes downwardly from the core 20, an undesirable entanglement of the discharge air DW in an area downwardly of the radiator 15 can be assuredly prevented, and an undesirable backward flow of a portion of the discharge air DW towards front of the radiator 15 can be further effectively avoided.

The outer diameter D of the cooling fan 28 is made large enough to allow the diameter D to become substantially equal to the vertical length H of the core 20. Therefore, the heat radiating efficiency can be increased by guiding air towards a major portion of the core 20 even under a condition in which the incoming wind W cannot be utilized sufficiently such as during, for example, a low speed running or parking. Also, the length P of protrusion of the fan covering 30 downwardly from the core 20 is made small enough to become 0.1 to 0.3 times the vertical length H of the core 20. Accordingly, the fan covering 30 will not become large in size unnecessarily and, therefore, the increase in size of the radiator 15 in its entirety including the fan covering 30 can be suppressed. Moreover, since the protrusion length P is so suppressed as discussed above, an undesirable lowering of the velocity of flow of the discharge air DW from the cooling fan 28 in the radiator 15, which would occur as a result of a loss resulting brought about by the friction taking place with an inner surface of the fan covering 30, is suppressed. As a result thereof, the discharge air DW can be smoothly discharged through the opening 30a of the fun covering 30.

The guide portion 34 is formed in the fan adjacent region of the partition wall 32, which faces the outer periphery of the cooling fan 28, and the air can be guided toward the outer periphery of the fan housing 37 of the cooling fan 28 along the guide portion 34. Accordingly, even when the discharge air DW entangles over the partition wall 32 and downwardly of the core 20, the discharge air DW can be guided towards the outer periphery of the fan housing 37 together with air. As a result, the discharge air DW can be quickly discharged from the downwardly oriented opening 30a of the fan covering 30 without passing again in the cooling fan 28.

In addition, since the guide portion 34 is provided so as to confront the lower half portion of the cooling fan 28, the back flow of the discharge air DW, which is to be discharged downwardly from the cooling fan 28, in a direction forwardly of the core 20 can be suppressed while the size of the fan covering 30 is made as small as possible.

As shown in FIG. 4, the fan covering 30 is fitted to the core 20 through the mounting piece 31, and the fan covering 30, the partition wall 32 and the mounting piece 31 form the one piece structure. Accordingly, the handlability is increased with the number of component parts reduced and, also, the fitting of the fan covering 30 to the core 20 can be conveniently performed.

Yet, the rear wall 3c for enclosing the cooling fan 28 from the downstream side (rear side) as shown in FIG. 3 lies perpendicular to the shaft axis C of the cooling fan 28. In view of this, as compared with the case in which for smoothening the downward flow of the discharge air DW the rear wall 30c is inclined rearwardly from top to down, that is, a so-called flaring fan outlet space is formed, the axial dimension of an upper portion of the fan outlet space, that is, the depth of an upper portion of the fan covering 30 is increased. Accordingly, the discharge air DW from the downwardly oriented opening 30a of the fan covering 30 can be smoothly discharged. Moreover, the upper portion of the core 20 is sufficiently ventilated and the heat radiating efficiency of the radiator 15 increases accordingly.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, although in describing the preferred embodiment of the present invention the saddle-riding vehicle referred to hereinabove has been shown and described as the motorcycle, the present invention can be equally applied even when the saddle-riding vehicle is a three or four-wheeled vehicle such as an irregular ground travelling vehicle. Also, for the drive source, an electric drive motor may be used.

Accordingly, such changes and modifications are, unless they depart from the scope of the present invention as delivered from the claims annexed hereto, to be construed as included therein.

REFERENCE NUMERALS

15 . . . Radiator
20 . . . Core
28 . . . Cooling fan
29 . . . Electric drive motor
30 . . . Fan covering
30a . . . Opening
30c . . . Rear wall
31 . . . Mounting piece
32 . . . Partition wall
34 . . . Guide portion
37 . . . Fan housing
C . . . Shaft axis (of the electric drive motor)
DW . . . Discharge air
W . . . Incoming wind

What is claimed is:

1. A radiator for a saddle-riding vehicle for radiating heat from a cooling medium in a drive source that is mounted on the saddle-riding vehicle, the radiator being detachably fitted to a vehicle frame structure of the saddle-riding vehicle, which radiator comprises:
   a core through which the cooling medium flows;
   a cooling fan disposed on a downstream side of the core with respect to a flow direction of an incoming wind and configured to ventilate the core;
   a fan covering opened downwardly and configured to enclose regions above the cooling fan, opposite sides of the cooling fan and a downstream side of the cooling fan with respect to the flow direction, the fan covering being fitted to the core; and
   a partition wall partitioning between a lower portion of the core and a lower portion of the cooling fan, the partition wall suppressing backflow of a discharge air from the opening of the fan covering towards the core, the partition wall protruding downwardly from an undersurface of the core.

2. The radiator for the saddle-riding vehicle as claimed in claim 1, in which the partition wall protrudes downwardly beyond the core.

3. The radiator for the saddle-riding vehicle as claimed in claim 1, in which the cooling fan has an outer diameter D that is substantially identical to the vertical length H of the core, and the length P of protrusion of the fan covering from the core to an area downwardly of is within the range of 0.1 to 0.3 times the vertical length H of the core.

4. The radiator for the saddle-riding vehicle as claimed in claim 1, in which
   the fan covering is fitted to the core through a mounting piece, and
   the fan covering, the partition wall and the mounting piece form a one piece construction.

5. The radiator for the saddle-riding vehicle as claimed in claim 1, in which a rear wall for enclosing the cooling fan from the downstream side with respect to the flow direction lies perpendicular to a shaft axis of the cooling fan.

6. The radiator for the saddle-riding vehicle as claimed in claim 1, in which the fan covering is, as viewed in a direction along a shaft axis of the cooling fan, of a generally inverted U-shape with an upper portion reduced in widthwise dimension and also with a lower portion thereof increased in widthwise dimension.

7. A radiator for a saddle-riding vehicle for radiating heat from a cooling medium in a drive source that is mounted on the saddle-riding vehicle, which radiator comprises:
   a core through which the cooling medium flows;
   a cooling fan disposed on a downstream side of the core with respect to a flow direction of an incoming wind and configured to ventilate the core;
   a fan covering opened downwardly and configured to enclose regions above the cooling fan, opposition sides of the cooling fan and a downstream side of the cooling fan with respect to the flow direction; and
   a partition wall partitioning between a lower portion of the core and a lower portion of the cooling fan, the partition wall suppressing backflow of a discharge air from the opening of the fan covering towards the core, wherein
   the partition wall includes a fan adjacent region confronting an outer periphery of the cooling fan formed with a guide portion which is inclined towards a downstream side in a direction radially inwardly of the cooling fan so that the discharge air is guided towards an outer periphery of a fan housing of the cooling fan.

8. The radiator for the saddle-riding vehicle as claimed in claim 7, in which the guide portion is provided to confront an outer periphery of a lower half portion of the cooling fan.

9. The radiator for the saddle-riding vehicle as claimed in claim 7, in which an angle of inclination θ of the guide portion relative to a front surface of the cooling fan is so set as to be within the range of 30° to 60°.

* * * * *